(12) United States Patent
Canevari

(10) Patent No.: US 7,765,732 B1
(45) Date of Patent: Aug. 3, 2010

(54) FISHING ROD SUPPORT

(76) Inventor: Raymond A. Canevari, 324 E. Sunset Ave., Pensacola, FL (US) 32507

( * ) Notice: Subject to any disclaimer, the term of this patent is extended or adjusted under 35 U.S.C. 154(b) by 0 days.

(21) Appl. No.: 12/379,424

(22) Filed: Feb. 20, 2009

(51) Int. Cl.
*A01K 97/10* (2006.01)
(52) U.S. Cl. .................. 43/21.2; 224/922; 224/200
(58) Field of Classification Search .......... 43/21.2; 224/922, 200, 197, 191; 135/65, 68, 69, 135/71–73, 75, 76; D22/147, 148
See application file for complete search history.

(56) References Cited

U.S. PATENT DOCUMENTS

| | | | | | |
|---|---|---|---|---|---|
| 254,348 | A | * | 2/1882 | Maine | 135/72 |
| 507,481 | A | * | 10/1893 | Brooks | 224/200 |
| 869,128 | A | * | 10/1907 | Autenrieth | 135/72 |
| 877,802 | A | * | 1/1908 | Shuster | 224/200 |
| 903,682 | A | * | 11/1908 | Cumpston | 224/200 |
| 1,183,008 | A | * | 5/1916 | Hipwood | 135/68 |
| 1,332,642 | A | * | 3/1920 | Tarbell | 135/73 |
| 1,399,683 | A | * | 12/1921 | Beavers | 224/200 |
| 1,451,732 | A | * | 4/1923 | Hipwood | 43/21.2 |
| 1,957,473 | A | * | 5/1934 | Pirtle et al. | 135/73 |
| 2,037,015 | A | * | 4/1936 | Fallon | 135/73 |
| 2,347,443 | A | * | 4/1944 | Vesely | 43/21.2 |
| 2,429,409 | A | * | 10/1947 | Eidman | 135/72 |
| 2,539,080 | A | * | 1/1951 | Hoover | 43/21.2 |
| 2,547,265 | A | * | 4/1951 | Hilgeman | 135/73 |
| 2,653,406 | A | * | 9/1953 | Grabiak et al. | 43/25 |
| 2,696,826 | A | * | 12/1954 | Davies | 135/73 |
| 2,995,855 | A | * | 8/1961 | Bell | 43/21.2 |
| 3,009,612 | A | * | 11/1961 | Fischett | 224/200 |
| 3,159,939 | A | * | 12/1964 | Transeau | 43/21.2 |
| 3,254,659 | A | * | 6/1966 | Williams | 135/69 |
| 3,287,844 | A | * | 11/1966 | Hoxter | 43/21.2 |

(Continued)

FOREIGN PATENT DOCUMENTS

GB    2048633 A   * 12/1980

(Continued)

OTHER PUBLICATIONS

Website, http://www.backcountry.com/store/HAR0102/Harmony-Fly-Cast-Fishing-Rod-Holder.html?CMP_ID=SH_FRO001 &CMP_SKU=HAR0102&mv_pc=r126, Harmony Fly Cast Fishing Rod Holder, two pages printed from the internet on Jan. 25, 2009.

*Primary Examiner*—Darren W Ark
(74) *Attorney, Agent, or Firm*—Richard C. Litman

(57) ABSTRACT

The fishing rod support is a versatile device providing support or bracing for the handle or butt of a fishing rod against a portion of the angler's body. The support includes an elongate pad joined to a crosspiece having three sockets. When the butt of the rod is placed in either of the two aligned sockets, the pad is generally parallel to the rod. This allows the pad to be placed under the arm to restrain upward movement of the rod butt as the angler lifts the rod. Alternatively, the butt of the rod may be placed in the third socket, with the pad aligned generally perpendicular to the rod. In this configuration, the pad is placed against the forward body of the angler (e.g., upper thigh, hip, waist, etc.) for bracing. The fishing rod support is particularly useful for anglers having back pain or limited upper body strength.

12 Claims, 5 Drawing Sheets

U.S. PATENT DOCUMENTS

| | | | | |
|---|---|---|---|---|
| D221,278 S | * | 7/1971 | Wright | 43/21.2 |
| 3,885,721 A | * | 5/1975 | Vanus | 224/200 |
| 3,966,151 A | * | 6/1976 | Hawkins, III | 43/21.2 |
| D240,425 S | * | 7/1976 | Gurgiolo | D22/147 |
| 4,041,635 A | | 8/1977 | Savage | |
| 4,245,659 A | * | 1/1981 | Shofner | 135/68 |
| 4,498,257 A | * | 2/1985 | Jekel | 43/21.2 |
| 4,700,502 A | * | 10/1987 | McFarland et al. | 43/21.2 |
| 4,763,435 A | * | 8/1988 | Deering | 43/21.2 |
| 4,817,323 A | * | 4/1989 | Braid | 43/21.2 |
| 4,828,152 A | * | 5/1989 | Pepping | 43/21.2 |
| 4,858,364 A | * | 8/1989 | Butts | 43/21.2 |
| 4,887,375 A | * | 12/1989 | Shedd et al. | 43/21.2 |
| 5,025,820 A | * | 6/1991 | Gamper | 135/72 |
| 5,058,308 A | * | 10/1991 | Girard | 43/21.2 |
| 5,341,829 A | * | 8/1994 | Hsiao et al. | 135/72 |
| 5,351,701 A | * | 10/1994 | Hsiao | 135/72 |
| 5,427,131 A | * | 6/1995 | Eggers, Jr. | 135/68 |
| 5,482,070 A | * | 1/1996 | Kelly | 135/72 |
| 5,488,798 A | * | 2/1996 | Beachel | 43/21.2 |
| 5,520,312 A | * | 5/1996 | Maddox | 43/21.2 |
| 5,533,295 A | * | 7/1996 | Hochberger | 43/21.2 |
| 5,533,536 A | * | 7/1996 | Hong | 135/65 |
| 5,551,184 A | * | 9/1996 | Grosse | 43/21.2 |
| 5,560,137 A | * | 10/1996 | Herring | 43/21.2 |
| 5,564,217 A | * | 10/1996 | Riedell | 43/21.2 |
| 5,647,161 A | * | 7/1997 | Miller, Sr. | 43/21.2 |
| D392,019 S | * | 3/1998 | Riedell | D22/147 |
| 5,738,257 A | * | 4/1998 | McConnell | 43/21.2 |
| 5,765,583 A | * | 6/1998 | Gamper | 135/68 |
| 5,778,592 A | * | 7/1998 | Malmberg | 43/21.2 |
| 5,865,180 A | * | 2/1999 | Sigfrid | 135/71 |
| D413,648 S | * | 9/1999 | Simpson et al. | D22/147 |
| 5,953,846 A | * | 9/1999 | Shelton | 43/21.2 |
| 5,954,074 A | * | 9/1999 | Mattson | 135/72 |
| 5,987,803 A | * | 11/1999 | White | 43/21.2 |
| 6,085,766 A | * | 7/2000 | Geary | 135/75 |
| 6,141,898 A | * | 11/2000 | Shelton | 43/21.2 |
| D438,281 S | * | 2/2001 | Webster | D22/147 |
| 6,185,856 B1 | * | 2/2001 | Yakabe | 43/21.2 |
| 6,209,253 B1 | * | 4/2001 | Saldana, Jr. | 43/21.2 |
| 6,269,990 B1 | | 8/2001 | Gray | |
| 6,397,868 B1 | * | 6/2002 | Smith | 135/68 |
| 6,438,889 B1 | * | 8/2002 | Handy | 43/21.2 |
| D464,705 S | | 10/2002 | Ratliffe | |
| 6,557,292 B1 | * | 5/2003 | Howard | 43/21.2 |
| D507,817 S | * | 7/2005 | Mitchell | D22/147 |
| 6,962,018 B1 | * | 11/2005 | King | 43/21.2 |
| 7,146,763 B1 | * | 12/2006 | Stanton | 43/21.2 |
| 7,296,377 B2 | * | 11/2007 | Wilcox et al. | 43/21.2 |
| 7,392,612 B2 | * | 7/2008 | Winkler | 43/21.2 |
| 7,444,777 B2 | | 11/2008 | Keys et al. | |
| 7,530,324 B2 | * | 5/2009 | Salerno | 43/21.2 |
| D599,877 S | * | 9/2009 | Battin, Jr. | D22/147 |
| 2004/0025926 A1 | * | 2/2004 | Gin et al. | 135/68 |
| 2005/0082321 A1 | * | 4/2005 | Macierowski et al. | 224/197 |
| 2005/0178041 A1 | * | 8/2005 | Zaffiro | 43/21.2 |
| 2007/0214708 A1 | | 9/2007 | Millen et al. | |
| 2008/0314426 A1 | * | 12/2008 | Estrada, Jr. | 135/68 |
| 2009/0025272 A1 | * | 1/2009 | Redd et al. | 43/21.2 |
| 2009/0101188 A1 | * | 4/2009 | Jacobs et al. | 135/72 |
| 2010/0083557 A1 | * | 4/2010 | Stanton | 43/21.2 |

FOREIGN PATENT DOCUMENTS

| | | | |
|---|---|---|---|
| GB | 2200021 A | * | 7/1988 |
| GB | 2243282 | | 10/1991 |
| GB | 2318715 A | * | 5/1998 |
| GB | 2360686 A | * | 10/2001 |
| JP | 03198735 A | * | 8/1991 |
| JP | 6-038654 | | 2/1994 |
| JP | 10201406 A | * | 8/1998 |
| JP | 11155452 A | * | 6/1999 |
| JP | 11318303 A | * | 11/1999 |
| JP | 2000083549 A | * | 3/2000 |
| JP | 2000139281 A | * | 5/2000 |
| JP | 2000157135 A | * | 6/2000 |
| JP | 2002262748 A | * | 9/2002 |
| JP | 2006314290 A | * | 11/2006 |
| JP | 2007159428 A | * | 6/2007 |
| WO | WO 03022044 A1 | * | 3/2003 |

* cited by examiner

US 7,765,732 B1

FISHING ROD SUPPORT

BACKGROUND OF THE INVENTION

1. Field of the Invention

The present invention relates generally to fishing, and more particularly to a fishing rod support that provides a versatile device for supporting the butt or handle of a fishing rod against various portions of the angler's body.

2. Description of the Related Art

Sport and game fishing are increasingly popular activities for many people. Generally, these activities do not require a great deal of upper body strength or exertion, particularly with smaller freshwater fish (bass, etc.). However, there are many exceptions to the above statement, particularly with larger ocean fish. While most anglers do not fish for marlin or other game fish weighing perhaps over a thousand pounds, even smaller fish such as large tuna and some freshwater catfish and sturgeon can require considerable upper body strength to hold the fishing rod while fighting such a large fish.

This can be of even greater concern for an angler who has injured his or her back and/or lacks upper body strength or flexibility for whatever reason. The strength required to manipulate a large and heavy rod and reel, and to fight a larger fish can result in undue pain and discomfort for such a disabled individual, thus removing a great deal of the satisfaction and pleasure from the sport.

Thus, a fishing rod support solving the aforementioned problems is desired.

SUMMARY OF THE INVENTION

The fishing rod support is a versatile device providing support or bracing for the handle or butt of a fishing rod against a portion of the angler's body. The fishing rod support may be formed of a series of pipe or tube elements comprising a cross and modified tee joined by a nipple extending between the stem of the tee and one of the arms of the cross, with an underarm crutch pad attached to the crossmember of the tee. Alternatively, the above structure may be cast or otherwise formed as one or more integral components, if so desired. One or more additional sleeves may be permanently or removably installed in one or more of the arms of the cross, to provide for different fishing rod handle or butt diameters.

The support may be used in a variety of ways, depending upon the needs of the angler. The handle or butt of the fishing rod may be inserted into either of the two opposed ends of the cross, to extend generally parallel to the length of the crutch pad. The crutch pad is then positioned beneath the arm of the angler. In this configuration, the butt of the rod is restrained when the angler lifts the forward portion of the handle of the rod, thus enabling the angler to pull the rod back and up with minimal exertion.

Alternatively, the butt of the fishing rod may be inserted into the end of the cross opposite the tee connection, with the crutch pad extending generally normal to the length of the rod. In this configuration, the crutch pad may be braced against the forward portion of the angler's body (upper thigh, hip, forward waist or stomach, etc.). Again, manipulation of the rod is greatly facilitated by the angler due to the leverage provided by the relatively fixed location of the butt of the rod.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The fishing rod support is used for bracing the butt end of the rod against some part of the angler's body. This enables the angler to manipulate the rod much more easily, particularly when raising the tip of the rod as when reeling in a large fish.

Figure 1:
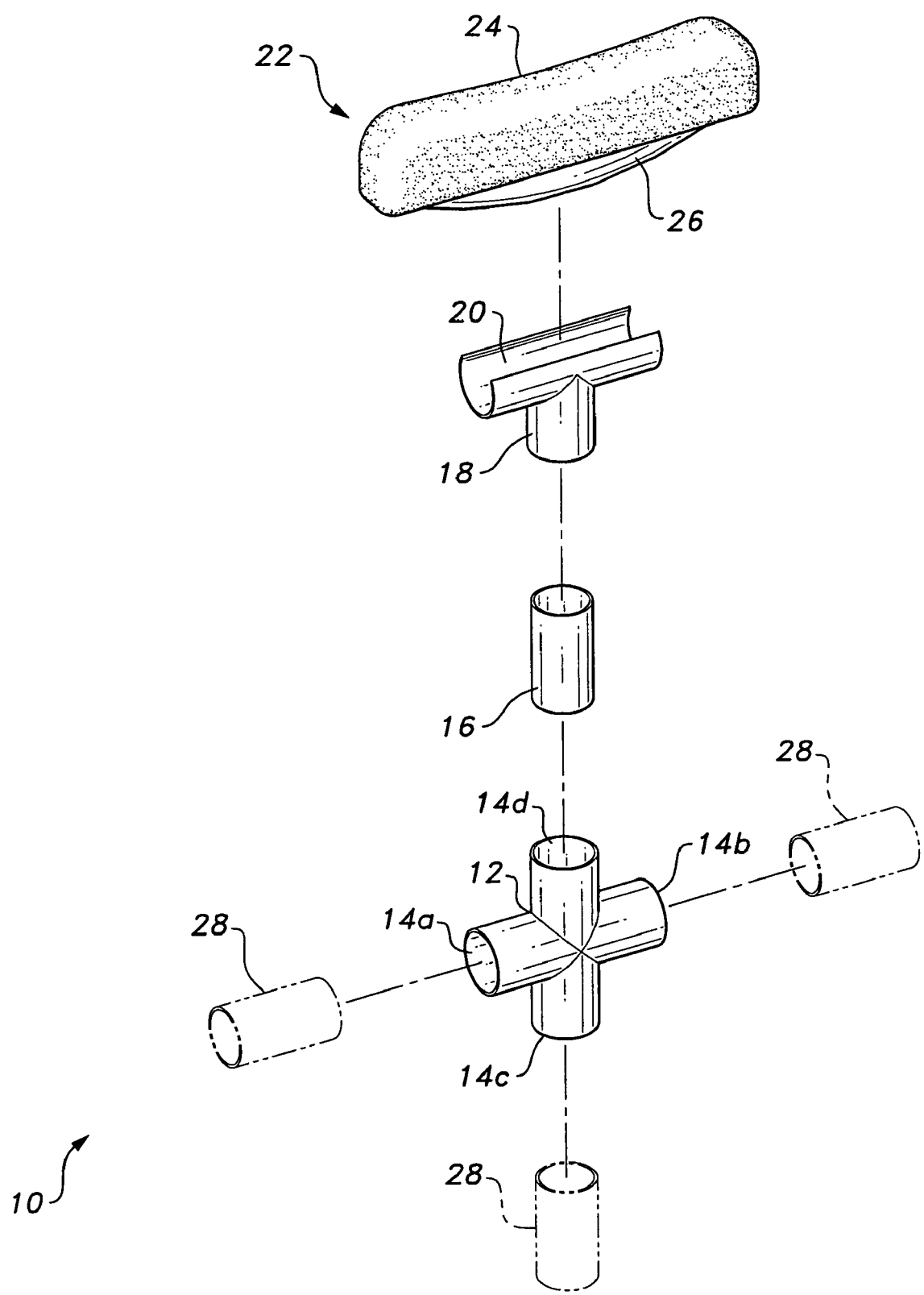
FIG. 1 is an exploded perspective view of a fishing rod support according to the present invention, showing its components and their assembly.

FIG. 1 of the drawings is an exploded perspective view of a series of components that may be used to construct the fishing rod support 10. These components may comprise various pipe fittings or the like formed of various materials, e.g., metal, and/or composites, but preferably the support 10 and its various components are formed of plastic, and most preferably polyvinyl chloride (PVC) plastic.

A pipe cross 12 or equivalent fitting or receptacle includes multiple branches, with each having a socket for the insertion of the butt of a fishing rod therein. The first and second sockets 14a, 14b are mutually opposed relative to one another, with the third and fourth sockets 14c, 14d also being mutually opposed to one another and normal to the first two sockets 14a, 14b. A pipe nipple 16 is permanently affixed in the fourth socket 14d, with the remaining sockets serving as fishing rod butt sockets 14a through 14c.

A modified pipe tee 18 is permanently affixed to the pipe nipple 16 opposite the fourth socket 14d, with the pipe tee 18 and nipple 16 comprising a body brace pad attachment arm and providing for the attachment of a body brace pad to the support 10. The conventional tubular crossmember of the tee 18 is normal to the pad attachment arm assembly, and is partially cut away to form a channel 20. The upper edges of the channel 20 converge slightly, i.e., the upper edges are spaced apart from one another a distance slightly less than the diameter of the crossmember. This provides a clamping or retaining action for a device having a width close to that of the inside diameter of the crossmember.

An elongate, resilient body brace pad 22 is installed in the channel 20 of the modified tee 18. The brace pad 22 may comprise a conventional crutch underarm pad 24 installed upon a conventional crutch top with a depending, arcuate attachment portion 26 therebeneath. The attachment portion 26 forms a bow with a generally circular cross section beneath the crutch top, with the sides of the channel 20 spreading slightly around the attachment portion 26 to clip and secure the attachment portion 26 therein. As the channel 20 is parallel to the first and second rod butt sockets 14a and 14b, it will be seen that the body brace pad 22 is also disposed at least generally parallel to the first and second sockets 14a, 14b.

Figure 2:
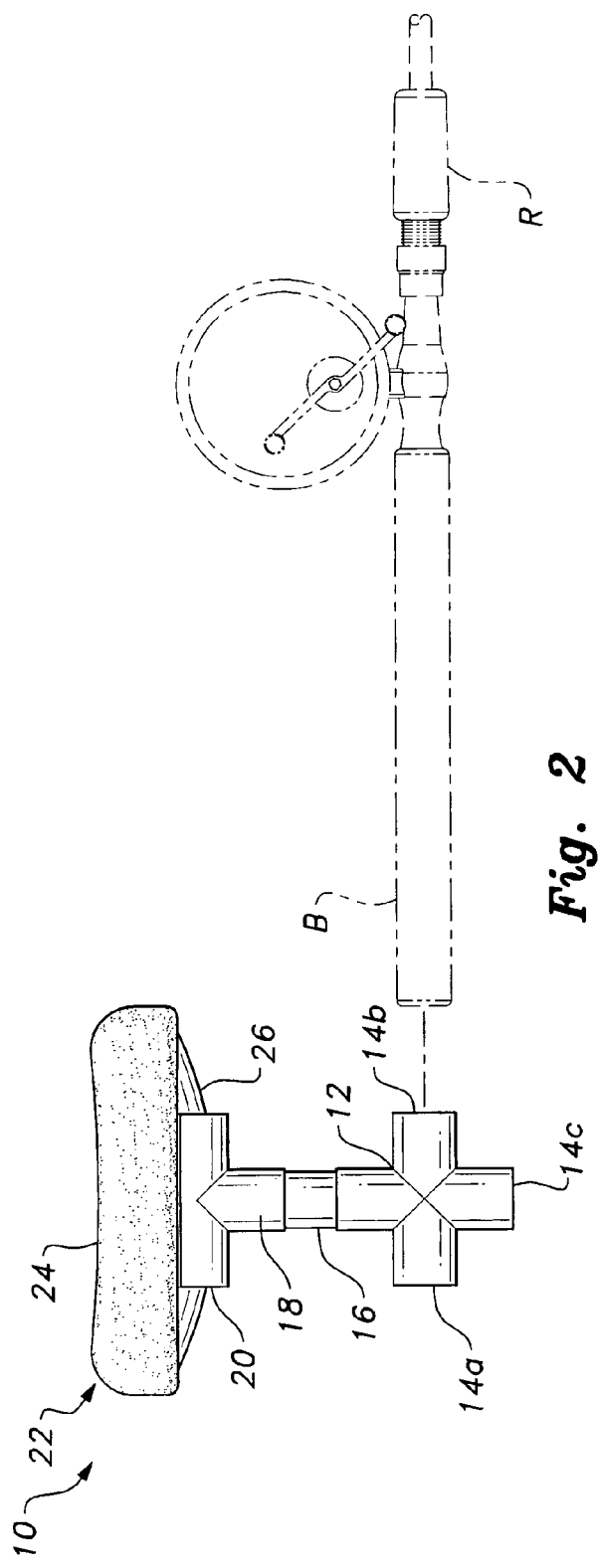
FIG. 2 is a side elevation view of the fishing rod support of FIG. 1, showing the installation of a fishing rod therein with the rod generally parallel to the elongate pad.
Figure 3:
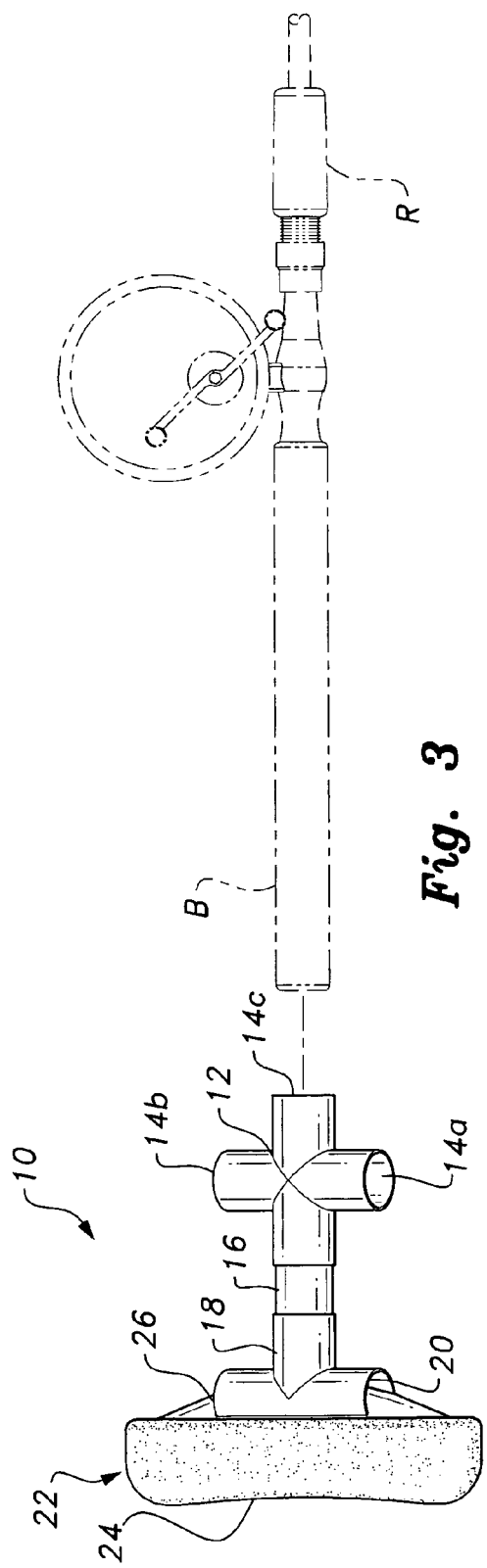
FIG. 3 is a perspective view of the fishing rod support of FIGS. 1 and 2 oriented differently than in FIG. 2, showing the installation of a fishing rod therein with the rod generally normal to the elongate pad.
Figure 4:
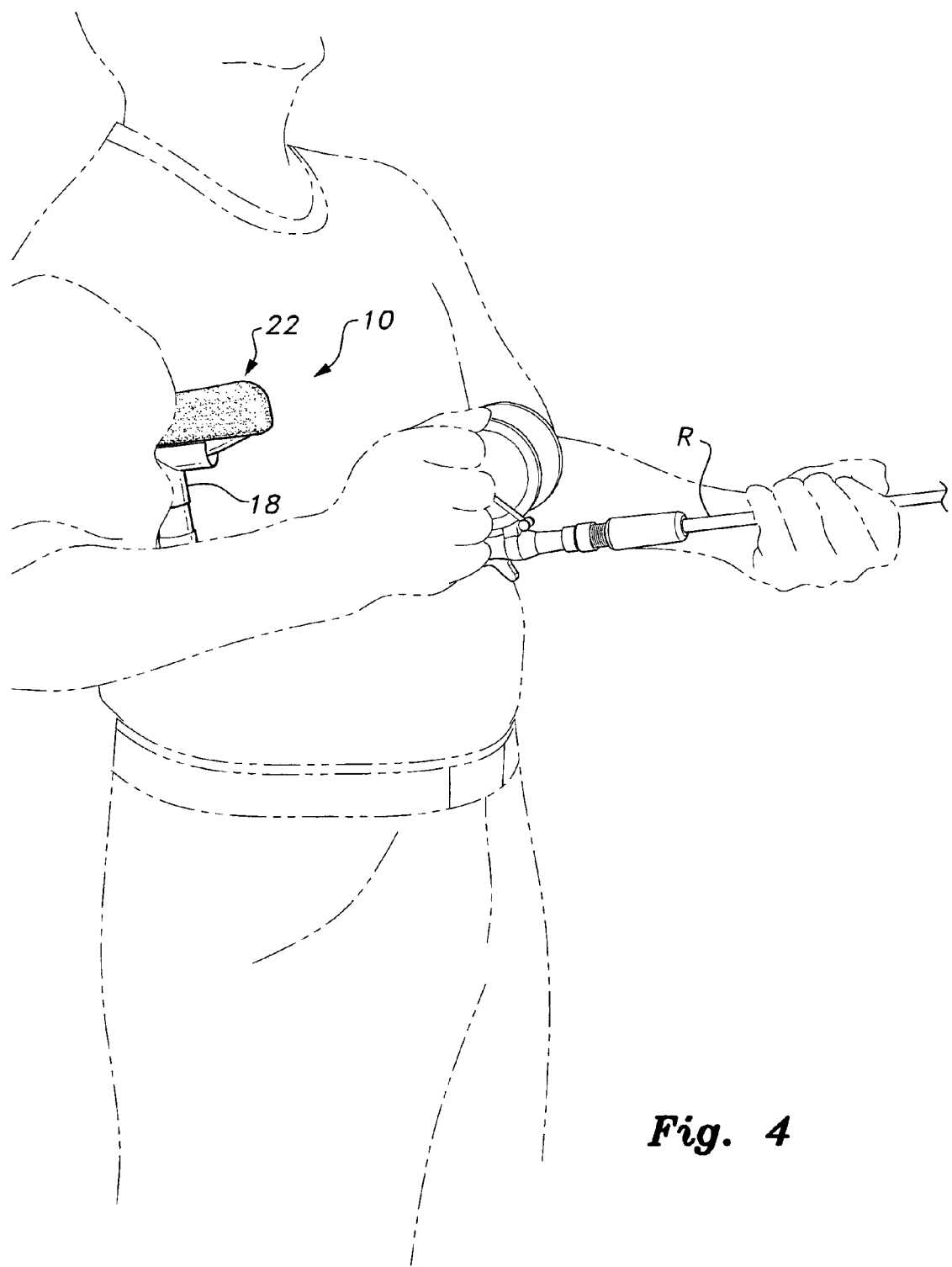
FIG. 4 is an environmental perspective view showing the use of the fishing rod support of FIG. 1 as an underarm brace.

FIGS. 2 through 5 illustrate two different orientations for the removable placement of the butt B or handle end of a fishing rod R into the support 10, and two exemplary positions of use for the support 10. In FIGS. 2 and 4, the support 10 is oriented for use as an underarm brace or support. The butt B of the rod R is inserted into the second fishing rod butt socket 14b, with the body brace pad 22 being oriented generally parallel to the fishing rod R when the support 10 and fishing rod R are assembled as in FIGS. 2 and 4. It will be seen that the fishing rod support 10 is essentially symmetrical about the axis defined by the nipple 16, and thus the fishing rod butt end B may be inserted removably into either the first or second rod butt socket 14a or 14b with the orientation being as shown in FIGS. 2 and 4. A sleeve or sleeves 28, shown in broken lines in FIG. 1, of appropriate diameter may be removably or permanently installed within one or more of the sockets 14a through 14c as desired to accommodate smaller diameter rod butts B.

This arrangement enables the butt B or handle end of the fishing rod R to be tucked between the upper arm and side of the angler with the body brace pad 22 secured comfortably in the arm pit of the angler, generally as shown in FIG. 4. This allows the angler to lift or raise the fishing rod R with one hand and arm while operating the reel with the other without undue stress on the lifting arm or the angler's back and/or upper body, due to the leverage provided by the fulcrum defined by the body brace pad 22 captured in the arm pit of the angler.

Figure 5:
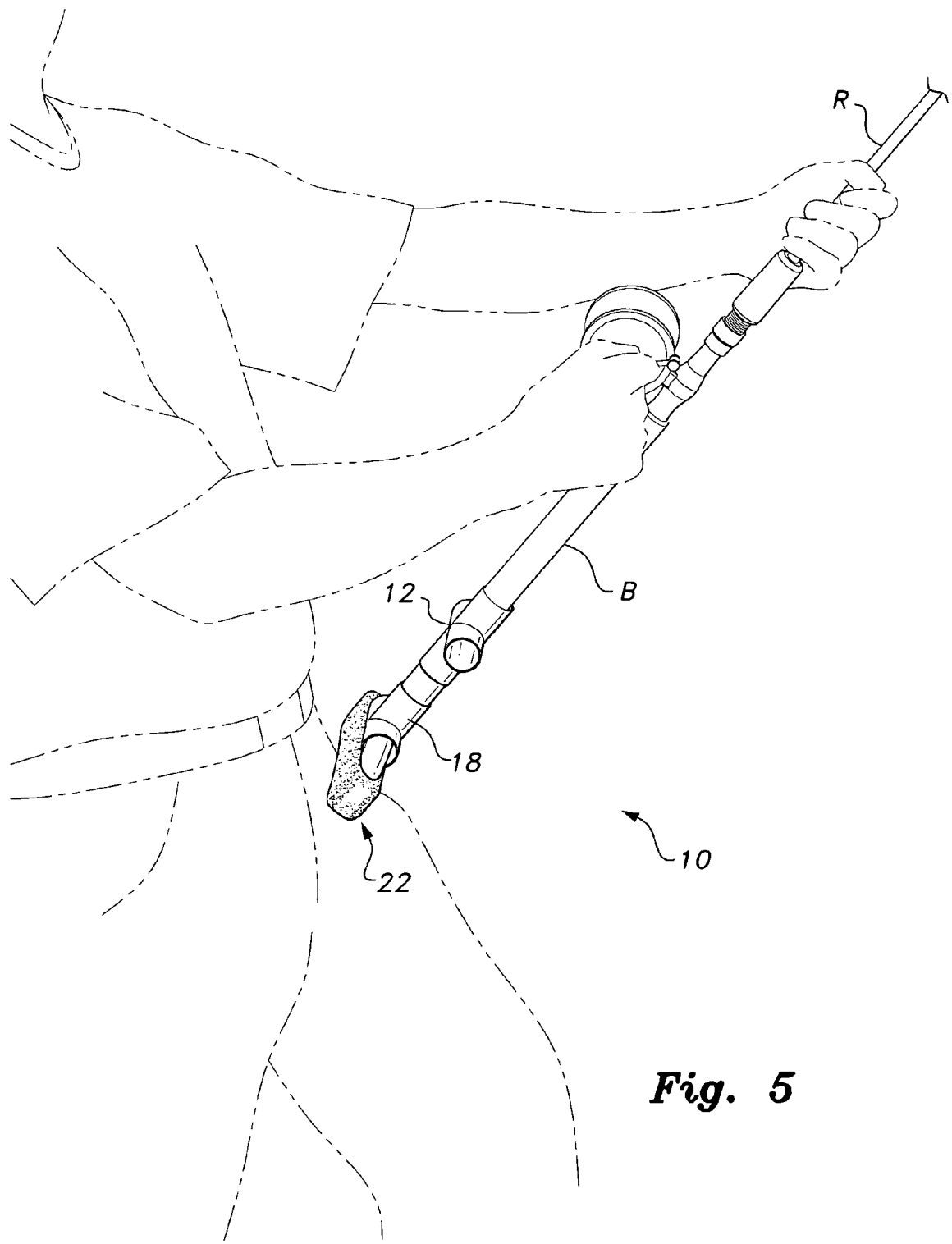
FIG. 5 is an environmental perspective view showing the use of the fishing rod support of FIG. 1 as a brace against the front of the body.

In FIGS. 3 and 5 the butt B of the fishing rod R is shown inserted into the third fishing rod butt socket 14c, normal to the first two sockets 14a, 14b and aligned with the fourth socket 14d, the nipple 16, and the stem of the modified tee 18. This results in the body brace pad 22 being aligned generally normal to the elongate axis of the fishing rod R, generally as shown in FIGS. 3 and 5. In this orientation the major axis of the fishing rod R is aligned generally normal to the angler's body, with the body brace pad 22 extending across a portion of the angler's body to serve as a fulcrum for the fishing rod R. The body brace pad 22 may be positioned as desired by the angler, e.g., against one upper thigh as shown in FIG. 5, or against one hip, adjacent the pelvic structure, on or adjacent to the belt line across the front of the body, etc., as desired. The result in either configuration of fishing rod and support is a much more comfortable and less demanding means of holding and manipulating a fishing rod, particularly when fighting and landing a relatively large fish.

Figure 6:
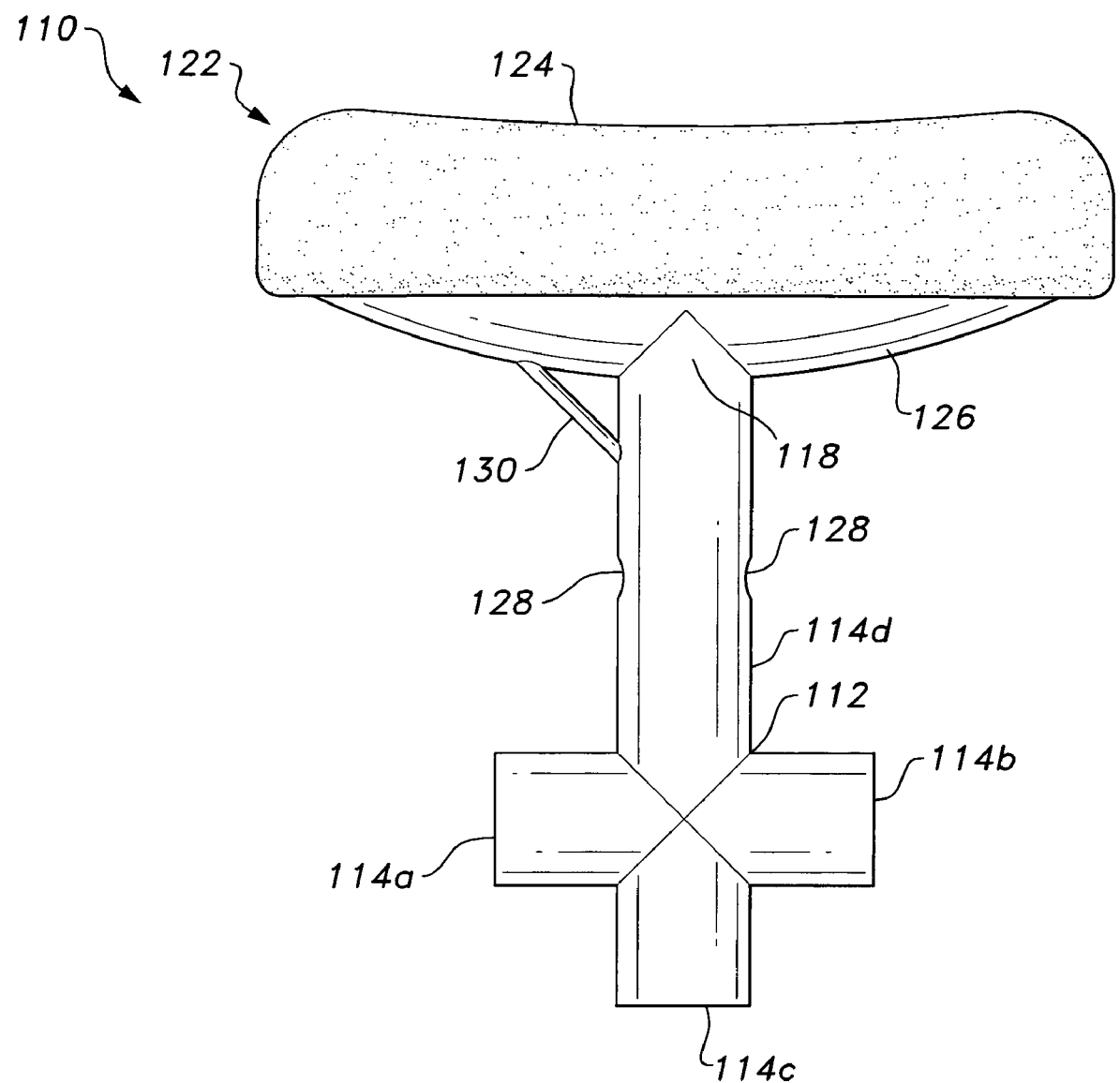
FIG. 6 is, a side elevation view of an alternative embodiment of a fishing rod support according to the present invention formed as a single, unitary component, with the exception of the pad.

FIG. 6 of the drawings is an illustration of an alternative embodiment of a fishing rod support 110, which is formed as a single rigid, unitary, monolithic component, with the exception of the resilient body brace pad removably attached thereto. The support 110 may be cast, forged, or otherwise formed as a single, unitary component, or may be constructed from separate components permanently secured to one another (e.g., welded, etc.). The support 110 includes a crossmember portion 112 having first through third fishing rod butt sockets 114a through 114c, with the sockets 114a and 114b being coaxial and directly opposite one another and the third socket 114c being normal to the sockets 114a, 114b. The fourth leg 114d of the crossmember 112 extends opposite the third socket 114c with its distal end 118, i.e., the end opposite the crossmember 112, joining to an arcuate body brace pad attachment member 126, thus obviating the need for an intermediate nipple portion. The crossmember 112, its leg 114d, and the pad attachment member 126 all form a rigid, unitary structure incapable of mechanical disassembly.

The resilient body brace pad or crutch pad 122 is stretched over the ends of the brace pad attachment member 126 for removable attachment thereto. The arcuate curvature of the attachment member 126 allows pressure to distend the pad 124 downwardly for further cushioning effect. The arcuate pad attachment member 126 is preferably joined to the fourth leg 114d of the crossmember 112 at a slight angle, i.e., the plane defined by the arcuate curvature of the member 126 is not coplanar with or parallel to the plane defined by the crossmember 112. Preferably, the two planes form an angle of about 5° with one another. This allows the body brace pad 124 and its attachment member 126 to meet the body more squarely when the fishing rod extending therefrom is at some angle thereto.

The longer fourth leg 114d of the fishing rod support 110 is also cross-drilled, as can be seen by the edges of the holes 128. The butt or handle of the fishing rod may also be diametrically drilled, with a retaining pin (not shown) inserted through the holes 128 of the rod support leg 114d and through the hole in the fishing rod butt or handle to prevent the fishing rod from turning or rotating relative to the fishing rod support 110. The support 110 also includes a lanyard attachment bracket 130, e.g., a gusset, web, etc. having a hole formed therethrough, or perhaps a short length of rod or the like welded or otherwise permanently attached diagonally between the distal end 118 of the fourth leg 114d and the adjacent portion of the pad attachment member 126. This provides for the removable attachment of a lanyard or the like (not shown) to the fishing rod support 110 for securing the support 110 to the apparel (belt, belt loop, etc.) of the angler.

It will be seen that any of the various features noted above for the fishing rod support 110, e.g., the stretched installation of the crutch pad 124 over the arcuate attachment member 126, the provision of fishing rod attachment holes or passages 128 through the fourth member 114d, and the provision for a lanyard attachment member 130, may be incorporated with the fishing rod support embodiment 10 of FIGS. 1 through 4, if so desired. In a similar manner, such features as the removable or permanently installed sleeves 28 of the fishing rod support 10 of FIGS. 1 through 5 to adjust the inner diameter of the sockets for different diameter fishing rod handles or butts may be incorporated with the embodiment 110 of FIG. 6, if desired. Regardless of the specific features incorporated with either of the embodiments, the fishing rod support 10 or 110 is a most valuable accessory to the angler who needs additional leverage or assistance when landing a larger fish and/or working with larger and heavier fishing tackle.

It is to be understood that the present invention is not limited to the embodiments described above, but encompasses any and all embodiments within the scope of the following claims.

I claim:

1. A fishing rod support, comprising:
   a pipe cross having first, second, third, and fourth branches, each of the branches having a socket disposed therein, the sockets comprise mutually opposed first and second fishing rod butt sockets and a third fishing rod butt socket orthogonal to the first and second sockets;
   a body brace pad attachment arm extending from one of the branches;

a body brace pad attachment channel extending from the arm normal thereto, the body brace pad attachment channel having a tubular shape and spaced apart upper edges that converge transverse to a longitudinal axis of the body brace pad attachment channel; and a body brace pad extending from one of the branches, the body brace pad being disposed generally parallel to the first and second rod butt sockets, the body brace pad being removably clipped into the attachment channel.

2. The fishing rod support according to claim 1, further comprising a sleeve disposed within at least one of the sockets.

3. The fishing rod support according to claim 1, wherein the body brace pad comprises a crutch pad.

4. The fishing rod support according to claim 1, wherein at least the fitting is formed of at least one material selected from the group consisting of plastic material, metal material, and composite material.

5. A fishing rod support, comprising:
   a fitting having at least one fishing rod butt socket therein, the fitting comprising a pipe cross having first, second, third, and fourth branches, the at least one fishing rod butt socket comprises a socket disposed in each of the branches, the fitting further comprises a multiple socket receptacle wherein the sockets of the at least one fishing rod butt socket comprise mutually opposed first and second fishing rod butt sockets and a third fishing rod butt socket orthogonal to the first and second sockets;
   a body brace pad attachment arm extending from the fitting;
   a body brace pad attachment channel extending from the arm normal thereto, the body brace pad attachment channel having a tubular shape and spaced apart upper edges that converge transverse to a longitudinal axis of the body brace pad attachment channel; and
   an elongate, resilient body brace pad removably clipped into the attachment channel, the body brace pad being disposed generally parallel to the first and second rod butt sockets.

6. The fishing rod support according to claim 5, further comprising a sleeve disposed within the at least one fishing rod butt socket.

7. The fishing rod support according to claim 5, wherein the body brace pad comprises a crutch pad.

8. The fishing rod support according to claim 5, wherein the fitting, the body brace pad attachment arm, and the body brace pad attachment channel are formed of at least one material selected from the group consisting of plastic material, metal material, and composite material.

9. A fishing rod support, comprising:
   a multiple socket receptacle comprising a pipe cross having first, second, third, and fourth branches, each of the branches having a socket disposed therein, the sockets of the multiple socket receptacle further comprising mutually opposed first and second fishing rod butt sockets and a third fishing rod butt socket orthogonal to the first and second sockets;
   a body brace attachment arm extending from the receptacle;
   a body brace pad attachment channel extending from the arm normal thereto, the body brace pad attachment channel having a tubular shape and spaced apart upper edges that converge transverse to a longitudinal axis of the body brace pad attachment channel; and
   an elongate, resilient body brace pad extending from the receptacle opposite the third rod butt socket, the pad extending generally parallel to the first and second rod butt sockets, the body brace pad being removably clipped into the attachment channel.

10. The fishing rod support according to claim 1, further comprising a sleeve disposed within at least one of the fishing rod butt sockets.

11. The fishing rod support according to claim 1, wherein the body brace pad comprises a crutch pad.

12. The fishing rod support according to claim 1, wherein the receptacle is formed of at least one material selected from the group consisting of plastic material, metal material, and composite material.

* * * * *